(12) United States Patent
Tozu et al.

(10) Patent No.: US 6,390,568 B1
(45) Date of Patent: May 21, 2002

(54) VEHICLE MOTION CONTROL SYSTEM

(75) Inventors: Kenji Tozu, Yokkaichi; Akitaka Nishio, Okazaki, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/609,710

(22) Filed: Jun. 30, 2000

(30) Foreign Application Priority Data

Jun. 30, 1999 (JP) ............................................. 11-186746

(51) Int. Cl.$^7$ ................................ B60T 7/12; B60T 8/48
(52) U.S. Cl. ................................ 303/114.3; 303/113.4; 303/140
(58) Field of Search .......................... 303/114.3, 113.3, 303/140, 112, 155, 166, DIG. 2, DIG. 3, DIG. 4

(56) References Cited

U.S. PATENT DOCUMENTS

| | | | |
|---|---|---|---|
| 4,966,248 A | | 10/1990 | Farr |
| 5,078,457 A | * | 1/1992 | Rittmannsberger et al. ...... 303/113.3 |
| 6,039,411 A | * | 3/2000 | Tozu et al. ............... 303/114.3 |
| 6,082,830 A | * | 7/2000 | Volz et al. ................ 303/113.4 |
| 6,185,497 B1 | * | 2/2001 | Taniguchi et al. .......... 303/140 |
| 6,193,331 B1 | * | 2/2001 | Yonehura et al. ............ 303/140 |
| 6,219,610 B1 | * | 4/2001 | Araki ......................... 303/140 |

FOREIGN PATENT DOCUMENTS

GB 2297134 * 7/1996

* cited by examiner

Primary Examiner—Matthew C. Graham
(74) Attorney, Agent, or Firm—Burns, Doane, Swecker & Mathis, LLP

(57) ABSTRACT

A vehicle motion control system which generates a minimized switching noise when a hydraulic pressure control valve is switched. The vehicle motion control system includes an automatic hydraulic pressure generator generating a hydraulic pressure irrespective of a brake pedal operation and a hydraulic pressure control valve adjusting the hydraulic brake pressure by opening or blocking a connection between the automatic hydraulic pressure generator and a wheel brake cylinder, and performs a motion control by controlling at least the hydraulic pressure control valve in accordance with the motion of a vehicle. The vehicle motion control system has a hydraulic pressure sensor detecting a generated hydraulic pressure of the automatic hydraulic pressure generator, setting a necessary hydraulic pressure for control, and adjusting the generated hydraulic pressure of the automatic hydraulic pressure generator by controlling the automatic hydraulic pressure generator in accordance with the result of a comparison between the actually generated hydraulic pressure of the automatic hydraulic pressure generator and the necessary hydraulic pressure for the motion control.

17 Claims, 10 Drawing Sheets

VEHICLE MOTION CONTROL SYSTEM

This application is based on and claims priority under 35 U.S.C. §119 with respect to Japanese Application No. 11(1999)-186746 filed on Jun. 30, 1999, the entire content of which is incorporated herein by reference.

FIELD OF THE INVENTION

This invention generally relates to a vehicle motion control system. More particularly, the present invention pertains to a vehicle motion control system which supplies hydraulic pressure generated by an automatic hydraulic pressure generator, capable of generating hydraulic pressure irrespective of a brake pedal operation, to a wheel brake cylinder via a control valve. This vehicle motion control system is applicable to a brake steering controller (a controller for preventing vehicle lateral skidding) and to a traction controller.

BACKGROUND OF THE INVENTION

A known type of vehicle motion control system is described in Japanese Patent No. 2790288 issued in 1998, and U.S. Pat. No. 4,966,248. In this vehicle motion control system, a switching solenoid valve is connected to a vacuum servo unit or vacuum booster. The switching solenoid valve is capable of being selectively switched between either a non-operative position in which a servo unit does not operates when a brake pedal is not depressed or an operative position in which a vacuum servo unit operates independently when the brake pedal is not depressed. During an acceleration slip of the driving wheels (i.e., during a traction control), the switching solenoid valve is switched to the operative position, the vacuum servo unit is operated, and a master cylinder generates a hydraulic pressure without any brake pedal operation. The master cylinder hydraulic pressure is controlled by a modulation unit (a hydraulic pressure control valve) and is supplied to a wheel brake cylinder of a driving wheel which is experiencing acceleration slipping.

The known system described above suffers from several drawbacks. Because the switching solenoid valve is maintained at the operative position during traction control, the hydraulic pressure generated in the master cylinder could exceed the hydraulic pressure that the traction control requires when a negative pressure supplied to a constant pressure chamber of the servo unit changes. An undesired switching noise is generated when a hydraulic brake pressure of a wheel brake cylinder is adjusted by the modulation unit in the above situation.

The switching noise is generated when the fluid communication between the master cylinder and the wheel brake cylinder is switched from the open to closed condition by the modulation unit while excessively high master cylinder hydraulic pressure exists. Also, when the fluid communication between the master cylinder and the wheel brake cylinder is switched from the closed to the open condition, a switching noise is generated by the differential pressure between the master cylinder and the wheel brake cylinder. Likewise, a switching noise is generated when the connection between the wheel cylinder and the reservoir is opened or closed by the modulation unit.

The phenomenon mentioned above occurs remarkably when the known vehicle motion control system is applied to a control for preventing vehicle lateral skidding because the hydraulic pressure necessary for the vehicle lateral skidding control is high.

In light of the foregoing, a need exists for a vehicle motion control system which generates less switching noise when the hydraulic pressure valve is switched while the motion control is under operation.

SUMMARY OF THE INVENTION

The present invention provides a vehicle motion control system that includes a wheel brake cylinder disposed on a wheel to supply a braking force to the wheel, an automatic hydraulic pressure generator which generates hydraulic pressure irrespective of brake pedal operation, a hydraulic pressure control valve disposed between the automatic hydraulic pressure generator and the wheel brake cylinder to adjust the hydraulic brake pressure of the wheel brake cylinder by controlling fluid communication between the automatic hydraulic pressure generator and the wheel brake cylinder, and a braking controller for performing the motion control by actuating the hydraulic pressure control valve in accordance with the motion condition of the vehicle. A hydraulic pressure detecting device detects the generated hydraulic pressure of the automatic hydraulic pressure generator, and a braking control mechanism includes a necessary hydraulic pressure setting device for setting a hydraulic pressure required for the motion control in accordance with the vehicle motion condition during the motion control, and a hydraulic pressure adjusting device for controlling the automatic hydraulic pressure generator and adjusting the generated hydraulic pressure thereof in accordance with the compared result of the actually generated hydraulic pressure of the automatic hydraulic pressure and the required pressure for the motion control.

The motion control system can also include a brake steering control, or control for preventing a vehicle lateral skidding, a traction control and an automatic brake control (a control of the distance between moving vehicles).

The system of the present invention is capable of reducing the switching noise generated when the hydraulic pressure control valve is switched. This is because the generated hydraulic pressure of the automatic hydraulic pressure generator is regulated to the level of the necessary hydraulic pressure for the motion control by adjusting the generated hydraulic pressure of the automatic hydraulic pressure generator in accordance with the comparison between the necessary hydraulic pressure for the motion control and the actually generated hydraulic pressure of the automatic hydraulic pressure generator.

Because the automatic hydraulic pressure generator is controlled in accordance with the result of the comparison between the necessary hydraulic pressure for control and the generated hydraulic pressure of the automatic hydraulic pressure generator, the operation frequency of the hydraulic pressure controller can be reduced. Thus the generation frequency of the switching noise can be reduced.

The necessary hydraulic pressure setting device sets the necessary hydraulic pressure of each wheel in accordance with the vehicle motion attitude during the motion control. Preferably, the hydraulic pressure adjusting device controls the automatic hydraulic pressure generator to adjust the generated hydraulic pressure in accordance with the comparison between the generated hydraulic pressure of the automatic hydraulic pressure generator and the maximum value of the necessary hydraulic pressure of a plurality of controlled wheels. The necessary hydraulic pressure is supplied to all of the controlled wheels securely because the generated hydraulic pressure of the automatic hydraulic pressure generator is adjusted in accordance with the result of the comparison between the generated hydraulic pressure of the automatic hydraulic pressure generator and the maximum value of the necessary hydraulic pressure of a plurality of the controlled wheels.

It is preferable that the hydraulic pressure adjusting mechanism is adapted to control the automatic hydraulic pressure generator to make the generated hydraulic pressure of the automatic hydraulic pressure generator correspond to the necessary hydraulic pressure of the controlled wheels. The switching noise generated when the hydraulic pressure control valve is switched and the frequency of generation of the switching noise can thus be reduced. Further, the necessary hydraulic pressure for the motion control can thus be supplied to the controlled wheels.

It is also preferable that the necessary hydraulic pressure setting device is adapted to set the necessary hydraulic pressure for the motion control for every motion control action, and to calculate the maximum value of a plurality of the necessary hydraulic pressures when a plurality of the motion controls are performed to the vehicle. Also, the hydraulic pressure adjusting device is adapted to adjust the generated hydraulic pressure of the automatic hydraulic pressure generator in accordance with the result of the comparison between the generated hydraulic pressure of the automatic hydraulic pressure generator and the maximum value of a plurality of the necessary hydraulic pressures. When the plurality of the motion controls are performed with respect to the vehicle, a plurality of motion controls are appropriately performed because the generated hydraulic pressure of the automatic hydraulic pressure generator is adjusted in accordance with the result of the comparison between the automatic hydraulic pressure generator and the maximum value of the plurality of necessary hydraulic pressures.

The brake controller includes a traction control device and a brake steering control device. The traction control device applies braking torque to a driving wheel by controlling the hydraulic pressure control valve in accordance with the acceleration slip condition of the driving wheel of the vehicle during the vehicle acceleration. The brake steering control device applies at least one wheel of the vehicle a braking force by controlling the hydraulic pressure control valve in accordance with the tendency of an oversteering or understeering condition of the vehicle. The necessary hydraulic pressure setting device sets the necessary hydraulic pressure for the traction control in accordance with the acceleration slip condition during the traction control and sets the necessary hydraulic pressure for each controlled wheel in accordance with the tendency of the oversteering or understeering condition of the vehicle during the brake steering control. In addition, the necessary hydraulic pressure setting device calculates the maximum value of the necessary hydraulic pressures of the brake steering control wheels set for each wheel and the necessary hydraulic pressure of the traction control. The hydraulic pressure adjusting device is adapted to adjust the generated hydraulic pressure by controlling the automatic hydraulic pressure generator in accordance with the result of the comparison between the generated hydraulic pressure of the automatic hydraulic pressure generator and the maximum value of the necessary hydraulic pressure.

When both traction control and the brake steering control to the vehicle are performed, the generated hydraulic pressure of the automatic hydraulic pressure generator is compared to the maximum value of the necessary hydraulic pressure of the brake steering control wheel, and the generated hydraulic pressure of the automatic hydraulic pressure generator is adjusted in accordance with the result. As a result, the traction control and the brake steering control are performed appropriately.

The automatic hydraulic generating device includes a master cylinder, a vacuum booster, and a switching solenoid valve. The master cylinder generates the hydraulic pressure corresponding to the depression force of the brake pedal. The switching solenoid valve is capable of selectively being switched to either a non-operative position in which the vacuum booster is not actuated or an operative position in which the master cylinder is operated by the actuation of the vacuum booster at least partially irrespective of the operation of the brake pedal. The hydraulic pressure adjusting device is adapted to adjust the master cylinder hydraulic pressure by controlling the switching solenoid valve in accordance with the result of the comparison between the master cylinder hydraulic pressure and the controlled wheels. A brake control actuator of the motion control device can thus be produced at a low cost.

The vacuum booster is comprised of a movable partition, a constant pressure chamber, a variable pressure chamber, a valve mechanism, an auxiliary movable partition, and an auxiliary variable pressure chamber. The constant pressure chamber is formed in front of the movable partition, and negative pressure is introduced into the constant pressure chamber. The variable pressure chamber is formed in back of the movable partition, and is set to select either the condition in which it is connected to the constant pressure chamber for introduction of negative pressure or the condition blocked from the constant pressure chamber and exposed to the atmosphere. The valve mechanism opens and closes the communication between the constant pressure chamber and the variable pressure chamber, and the connection between the variable pressure chamber and the atmosphere. The auxiliary movable partition is disposed in the constant pressure chamber, actuates the master cylinder in accordance with the depression of the brake pedal, and drives the master cylinder when the brake pedal is not operated. The auxiliary variable pressure chamber is formed between the auxiliary movable partition and the movable partition. Preferably, the switching solenoid valve is adapted to switch between an operative position that exposes the auxiliary variable pressure chamber to the atmosphere and a non-operative position that introduces negative pressure to the auxiliary variable pressure chamber.

According to another aspect of the invention, a vehicle motion control system includes a wheel brake cylinder for applying a braking force to a wheel, an automatic hydraulic pressure generator which generates a hydraulic pressure including during non-operation of a brake pedal, a hydraulic pressure control valve disposed between the automatic hydraulic pressure generator and the wheel brake cylinder to adjust hydraulic brake pressure supplied to the wheel brake cylinder by alternatively connecting and disconnecting at least the automatic hydraulic pressure generator and the wheel brake cylinder, a hydraulic pressure detector for detecting a generated hydraulic pressure of the automatic hydraulic pressure generator, and a brake controller for performing vehicle motion control by controlling at least the hydraulic pressure control valve in accordance with a motion condition of the vehicle. The brake controller includes a necessary hydraulic pressure setting mechanism for setting a necessary hydraulic pressure that is necessary for effecting the motion control in accordance with the motion condition of the vehicle and a comparing mechanism for comparing the necessary hydraulic pressure set by the necessary hydraulic pressure setting mechanism with the generated hydraulic pressure detected by the hydraulic pressure detecting mechanism. A hydraulic pressure adjusting device adjusts the generated hydraulic pressure of the automatic hydraulic pressure generator based on the results of the comparison between the necessary hydraulic pressure and the generated hydraulic pressure.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
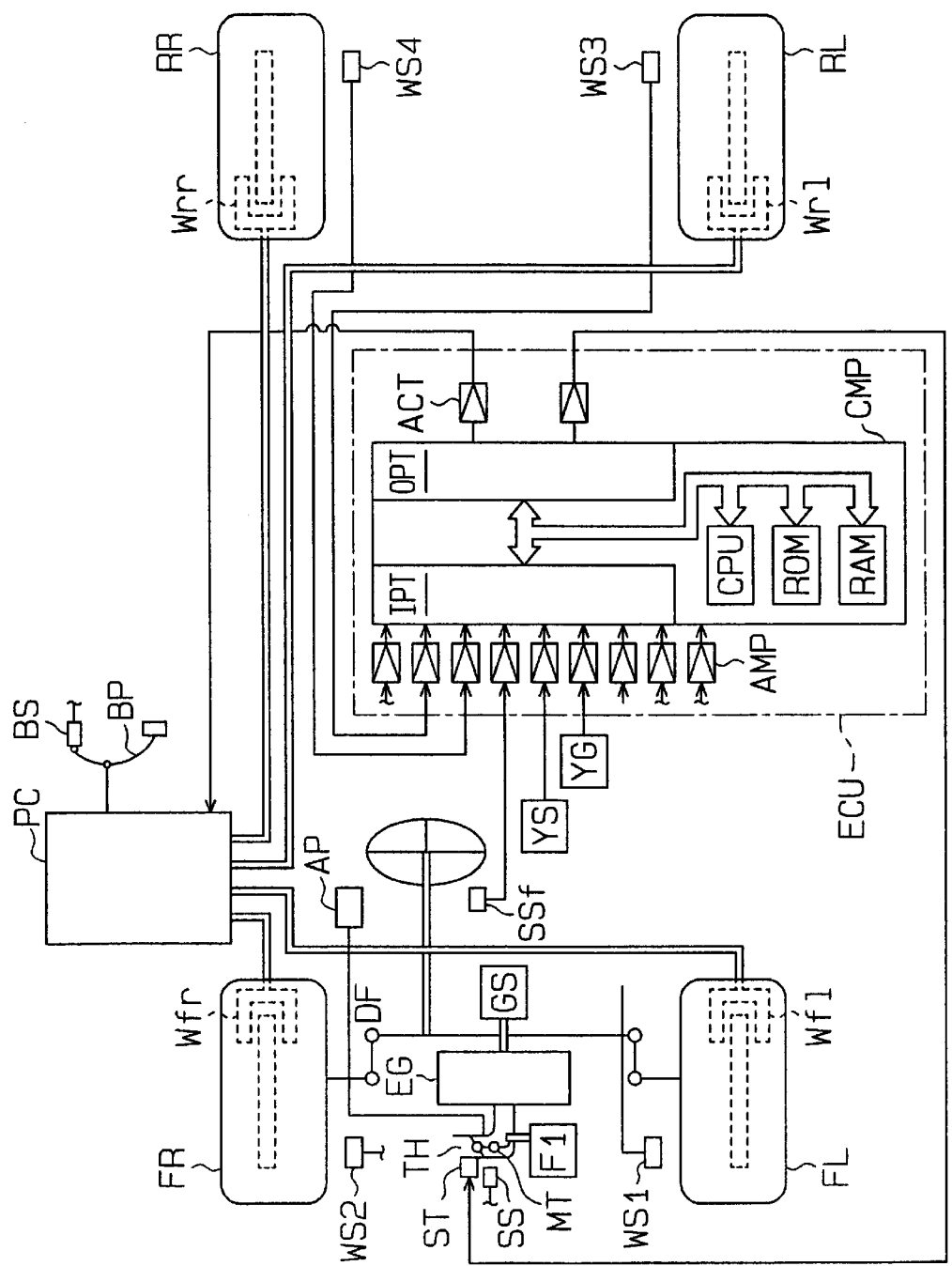
FIG. 1 is a schematic view of the vehicle motion control system according to an embodiment of the present invention.

An embodiment of a vehicle motion control system according to the present invention is described and explained below with reference to FIGS. 1–12. Referring initially to FIG. 1, in the vehicle braking control system, an internal combustion engine EG is provided with a throttle control device TH and a fuel injection device FI. The throttle control device TH controls the main throttle opening of a main throttle valve MT in accordance with the operation of an acceleration pedal AP. In accordance with the output of an electronic controller ECU, a sub-throttle valve ST of the throttle control device TH is operated to control a sub-throttle opening and the fuel injection device FI is operated to control the amount of fuel injection. The engine EG is connected to a pair of front wheels FL, FR through a transmission GS and a differential gear DF. The illustrated vehicle is a front wheel drive type vehicle.

The braking system includes wheel brake cylinders Wfl, Wfr, Wrl, Wrr mounted on respective wheels FL, FR, RL, RR. A hydraulic brake pressure control device is connected with these wheel brake cylinders FL, FR, RL, RR. The wheel FL represents the front left driving wheel, the wheel FR represents the front right driving wheel, the wheel RL represents the rear left driven wheel, and the wheel RR represents the rear right driven wheel. The hydraulic brake pressure control device described below is constructed in the manner shown in FIG. 2.

Wheel speed sensors WS1, WS2, WS3, WS4 are disposed on the respective wheels FL, FR, RL, RR. These wheel speed sensors WS1–WS4 are connected to the electronic controller ECU so that the rotational speed of each wheel, which is indicated as a pulse whose number is proportional to the respective wheel speed, is inputted to the electronic controller ECU. A plurality of elements are connected to the electronic controller ECU. These parts include: a brake switch BS turned on when a brake pedal BP is depressed; the front left wheel FL, a front wheel steering angle sensor SSf detecting the steering angle of the front wheels FL, FR; a lateral acceleration sensor YG detecting the lateral acceleration Gy of the vehicle; a yaw rate sensor YS detecting the yaw rate $\gamma$ of the vehicle; and a throttle sensor SS detecting the openings of the main throttle valve MT and the sub-throttle valve ST. The yaw rate sensor YS detects the rate of change of the vehicle rotation angle (yaw angle) at a vertical axis located at the center of gravity of the vehicle, which is called yaw rate. The yaw rate is outputted to the electronic controller ECU as an actual yaw rate $\gamma$.

A steering angle controller (not shown) can be attached between the rear wheels RL, RR. Using this device, the steering angle of the wheel RL, RR can be controlled by a motor (not shown) in accordance with the output of the electronic controller ECU.

The electronic controller ECU is provided with a microcomputer CMP which includes a central processing unit CPU, a read-only memory ROM, a random access memory RAM, an input port IPT, those of which are reciprocally connected through a bus. Output signals from the wheel speed sensors WS1–WS4, the brake switch BS, the front wheel steering angle sensor SSf, the yaw rate sensor YS, the lateral acceleration sensor YG, the throttle sensor SS, etc., are inputted via an amplifier circuit AMP and respective input port IPT into the central processing unit CPU. The control signal is outputted from the output port OPT to the throttle controller TH and the brake hydraulic controller PC respectively via driving circuits ACT. The read-only memory ROM memorizes a program dealing with various processes including the steps shown in the flowchart of FIG. 3. The central processing unit CPU runs the program while an ignition switch (not shown) is closed. The random access memory RAM tentatively memorizes variable data necessary for running the program. It should be noted that a plurality of microcomputers may be used for each control device such as the throttle control or may be used for several controls which relate to one another.

Figure 2:
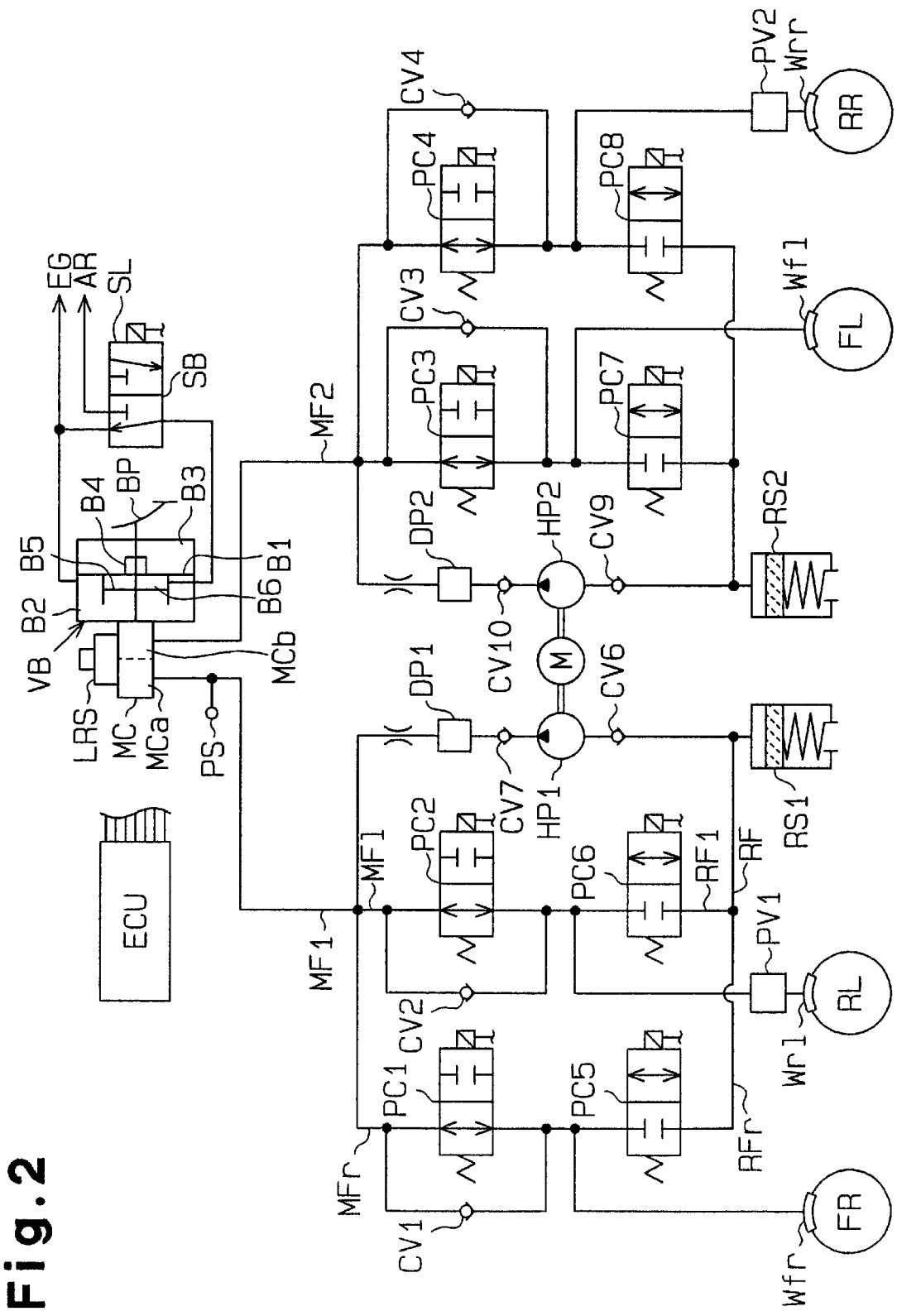
FIG. 2 is a schematic illustration of the hydraulic pressure system of the motion control system shown in FIG. 1.

FIG. 2 shows the brake hydraulic controller PC. A master cylinder MC is boosted via a vacuum booster VB in accordance with the operation of the brake pedal BP. The brake fluid in a master reservoir LRS is pressurized to output master cylinder hydraulic pressure to a hydraulic brake pressure system of the wheels FR, RL and another hydraulic brake pressure system of the wheels FL, RR, respectively. Thus, the illustrated braking system is a diagonal system. The master cylinder MC, which may be a tandem style master cylinder, consists of two pressure chambers MCa, MCb, each connected to one of the two brake hydraulic systems. The first pressure chamber MCa communicates with the hydraulic brake pressure system for the wheels FR, RL on the one side and the second pressure chamber MCb is connected to the hydraulic brake pressure system for the wheels FL, RR on the other side. A pressure sensor PS detecting the output hydraulic pressure of the master cylinder hydraulic pressure Pmc is disposed on the output side of the master cylinder, and the detected signal is inputted to the electronic controller ECU.

The vacuum booster VB is of a conventional structure and includes a constant pressure chamber B2 and a variable pressure chamber B3 separately formed by a movable partition B1. The movable partition B1 is connected to the brake pedal BP. A valve mechanism B4 is provided and includes a vacuum valve (not shown) interrupting communication between the constant pressure chamber B2 and the variable pressure chamber B3 and an air valve (not shown) interrupting communication between the variable pressure chamber B3 and the atmosphere. The constant pressure chamber B2 is in constant communication with an intake manifold (not shown) of the engine EG, and the negative pressure is introduced into the constant pressure chamber. The variable pressure chamber B3 can be selectively under one of two operating conditions, one in which the variable pressure chamber B3 is under a negative pressure by virtue of being in communication with the constant pressure chamber B2 or the other in which the variable pressure chamber B3 is disconnected from the constant pressure chamber B2 and is exposed to the atmosphere using the valve mechanism B4. The vacuum valve and the air valve of the valve mechanism B4 open and close in accordance with the operation of the brake pedal BP. The differential pressure derived from the operation of the brake pedal BP is generated between the constant pressure chamber B2 and the variable pressure chamber B3. As a result, the output boosted in accordance with the operation of the brake pedal BP is transmitted to the master cylinder.

The vacuum booster according to this embodiment includes an auxiliary movable partition B5 in the constant pressure chamber B2 and an auxiliary variable pressure chamber B6 formed between the movable partition B1 and the auxiliary movable partition B5. The auxiliary movable partition B5 can move in the direction of the master cylinder accompanying movement of the brake pedal BP and can move in the direction of the master cylinder irrespective of the operation of the brake pedal BP to actuate the master cylinder. The auxiliary variable pressure chamber B6 is structured to selectively be in the condition in which negative pressure is introduced by virtue of communication with the intake manifold of the engine EG and the condition in which it is exposed to the atmosphere in accordance with the operation of a booster switch valve (switching solenoid valve) SB. The booster switch valve SB is a three port two-position switching solenoid valve which includes a solenoid SL to effect a connection of the auxiliary variable pressure chamber B6 with the intake manifold at the non-operative position of the solenoid SL when the solenoid SL is de-energized (i.e., the normal condition), and to effect exposure of the auxiliary variable pressure chamber B6 to the atmosphere AR at the operative position when the solenoid SL is energized.

When negative pressure is introduced into the auxiliary variable pressure chamber B6 via the booster switch valve SB, the predetermined distance between the auxiliary movable partition B5 and the movable partition B1 is maintained and the auxiliary movable partition B5 moves in the direction of the master cylinder along with the movement of the brake pedal BP. When the auxiliary variable pressure chamber B6 is exposed to the atmosphere, a differential pressure between the constant pressure chamber B2 filled with negative pressure and the auxiliary variable pressure chamber B6 is generated. As a consequence, the master cylinder is operated irrespective of the operation of the brake pedal BP (that is, even when the brake pedal is not depressed) in accordance with the movement of the auxiliary movable partition B5, whereupon the master cylinder hydraulic pressure is generated. The vacuum booster VB, the booster switch valve SB and the master cylinder MC form an automatic hydraulic pressure generator.

With respect to the hydraulic brake pressure system on the FR and RL wheel side, the first pressure chamber MCa is connected to the wheel brake cylinders Wfr, Wrl respectively via a main hydraulic pressure conduit MF1 and respective branch hydraulic pressure conduits MFr, MFl.

The branch hydraulic pressure conduits or circuits MFr, MFl include normal open style two-port, two-position solenoid switching valves PC1, PC2 (switching valves), respectively. In addition, a check valve CV1, CV2 is disposed parallel to each of the switching valves. The check valves CV1, CV2 only allow brake fluid flow in the direction of the master cylinder. The brake fluid in the wheel brake cylinder Wfr, Wrl is returned to the master cylinder MC and the master cylinder reservoir LRS via these check valves CV1, CV2 and the switching valves PC1, PC2. Accordingly, the hydraulic pressure in the wheel brake cylinders Wfr, Wrl promptly follows the decrease of the hydraulic pressure of the master cylinder. Normally closed two-port, two-position solenoid switching valves PC5, PC6 (switching valves) are disposed on the respective branch hydraulic pressure conduits RFr, RFl on the discharge circuit connected to the wheel brake cylinders Wfr, Wrl. The discharge hydraulic pressure conduit RF merged by the branch hydraulic pressure conduits RFr and RFl is connected to an auxiliary reservoir RSI.

The auxiliary reservoir RS1 is connected to the suction side of a hydraulic pressure pump HP1 via a check valve CV6 and the emission or discharge side of the hydraulic pressure pump HP1 is connected at a point upstream of the switching valves PC1, PC2 via the check valve CV7. The hydraulic pressure pump HP1 is driven by an electric motor M, and the hydraulic pressure pump HP1 pumps brake fluid from the auxiliary reservoir RS1 to return it to the emission side. The auxiliary reservoir RS1 is disposed independently from the master reservoir LRS of the master cylinder MC. The auxiliary reservoir RS1 is provided with a piston and a spring, and is adapted to reserve a predetermined amount of brake fluid. The auxiliary reservoir can be referred to as an accumulator. The check valves CV6, CV7 function as a suction valve and an emission valve respectively and regulate the flow of brake fluid emitted through the hydraulic pressure pump HP1 in one direction. The check valves CV6, CV7 are preferably structured in one piece with the hydraulic pressure pump HP1.

A damper DP1 is disposed on the emission or discharge side of the hydraulic pressure pump HP1. In addition, a proportioning valve PV1 is disposed in the fluid pressure conduit that is connected to the wheel brake cylinder Wrl on the rear wheel side.

The hydraulic brake pressure system on the FL and RR wheel side is similar to the hydraulic brake pressure system on the FR and RL wheel side, and includes normally open type solenoid switching valves PC3, PC4, normally closed solenoid switching valves PC7, PC8, check valves CV3, CV4, CV9, CV10, an auxiliary reservoir RS2, a damper DP2, and a proportioning valve PV2 disposed in the manner shown in FIG. 2 and in a manner similar to that described above with respect to the hydraulic brake pressure system on the FR and RL wheel side. A hydraulic pressure pump HP2 is driven by the same electric motor M that drives the hydraulic pressure pump HP1.

The switch valves PC1–PC8 are the parts of the hydraulic pressure control valve that adjust the hydraulic brake pressure of the wheel brake cylinders of each wheel.

The aforementioned booster switch valve SB, switch valves PC1–PC8 and electric motor M are controlled by the electronic controller ECU as shown in FIG. 1. Various vehicle motion controls such as a brake steering control (oversteering control or understeering control) or traction control are performed by the parts mentioned above. When the ignition switch is on, a motion control program according to the flowchart in FIG. 3 is performed at a 6 ms calculation cycle.

Figure 3:
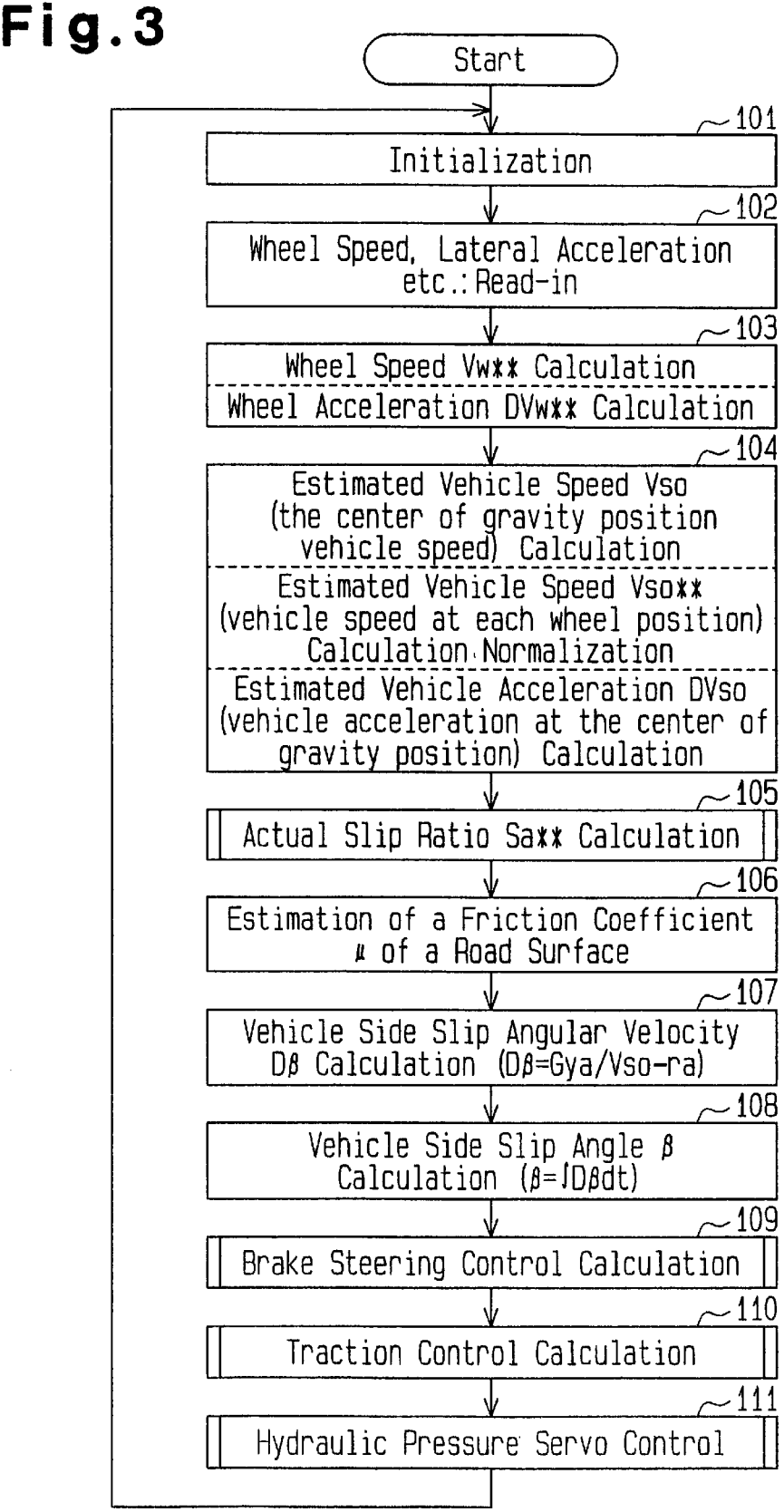
FIG. 3 is a flow chart explaining the process and operation of the motion control system according to the present invention.
Figure 4:
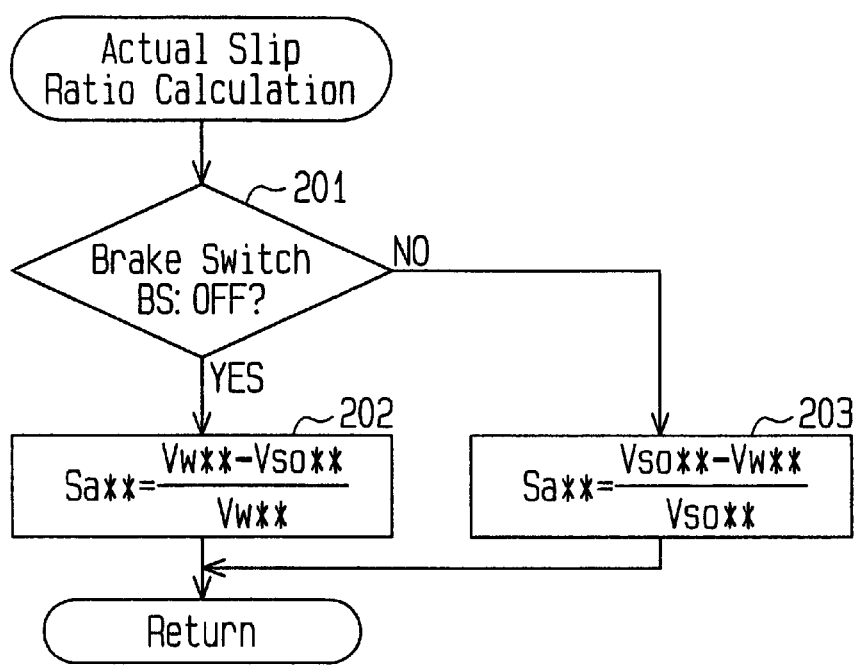
FIG. 4 is a flow chart showing the details of the actual slip ratio calculation carried out in step 105 of FIG. 3.

According to the flowchart in FIG. 3, the microcomputer CMP is first initialized in step 101. Then, in step 102 the microcomputer CMP reads in wheel speeds from the wheel speed sensors WS1–WS4, a detected signal of the front wheel steering angle (i.e., the steering angle $\theta f$), a detected signal of the yaw rate sensor YS (i.e., the actual yaw rate $\gamma$), a detected signal of a lateral acceleration sensor YG (i.e., the actual lateral acceleration indicated as Gya), the detected signal of the hydraulic pressure sensor PS (i.e., the master cylinder hydraulic pressure Pmc), etc.

In step 103, the wheel speed $Vw^{}$ of each wheel is calculated, the wheel acceleration $DVw^{}$ of each wheel is calculated by applying differential calculus to the wheel speed $Vw^{}$, and the actual wheel acceleration speed $FDVW^{}$ is determined by eliminating the noise with a filter (not shown). Next, in step 104 the estimated vehicle speed (the center of gravity position vehicle speed) Vso which is derived from the wheel speed $Vw^{}$ of each wheel at the center of gravity position is calculated. The center of gravity position vehicle speed Vso is calculated as Vso=MIN ($Vw^{}$) when the vehicle is under acceleration driving or constant speed driving and as Vso=MAX ($Vw^{}$) when the veicle is under braking. Next, the estimated vehicle speed (vehicle speed at each wheel position) $Vso^{}$ at the position of each wheel is calculated. If necessary, normalization to the vehicle speed at each wheel position is conducted to reduce the error derived from the difference between the minimum turning outer radius and the minimum turning inner radius when the vehicle is turning. A normalized vehicle speed $Nvso^{}$ is calculated as $Nvso^{}=Vso^{}(n)-\Delta Vr^{}(n)$. $\Delta Vr^{}(n)$ indicates a correction coefficient for correcting the turning. For example, the correction coefficient mentioned above is set as follows. The correction coefficient $\Delta Vr^{}$ (** indicates each wheel, with FW standing for the front wheels and RW standing for the rear wheels) is set following a map (not shown) of each wheel except the standardized wheel based on the turning radius R of the vehicle and $\gamma \cdot VsoFW$ (=lateral acceleration Gya). When $\Delta VrFL$ is set as a standardized wheel, $\Delta VrFL$ is equivalent to 0, $\Delta VrFR$ is set following the difference between the turning outer radius and the turning inner radius gap map, $\Delta VrRL$ is set following the difference between the minimum turning inner radius and the minimum turning inner radius gap map, $\Delta VrRR$ is set following a difference between the minimum turning outer radius and the minimum turning outer radius gap map and a difference between the minimum turning outer radius and the minimum turning inner radius gap map. A vehicle acceleration (vehicle acceleration at the center of gravity position) DVso in the longitudinal direction at the center of gravity position of the vehicle is calculated by applying differential calculus to the vehicle speed Vso at the center of gravity position.

The program then proceeds to step 105 where the actual slip ratio $Sa^{}$ of each wheel is calculated using the wheel speed $Vw^{}$ of each wheel and the vehicle speed $Vso^{}$ at each wheel position obtained from steps 103 and 104. The actual slip rate calculation in step 105 of the flowchart shown in FIG. 3 is carried out using the subroutine shown in FIG. 4. In step 201 of FIG. 4, it is determined whether the brake switch BS is on or off. When the brake switch BS is off (that is when the vehicle is under acceleration driving or constant speeding driving), the actual slip ratio is calculated in step 202 applying the equation $Sa^{}=(Vw^{}-Vso^{})/Vw^{}$. When the brake switch Bs is on (that is when the vehicle is under braking), the actual slip ratio is calculated as $Sa^{}=(Vso^{}-Vw^{})/Vso^{**}$.

The operation then returns to the flow chart in FIG. 3 and at step 106, a friction coefficient $\mu$ of the road surface is estimated or approximated as $\mu=(DVso^2+Gya^2)^{\frac{1}{2}}$ based on the vehicle acceleration DVso at the center of gravity position and the actual acceleration Gya from the detected signal of the lateral acceleration sensor. The friction coefficient $\mu^{}$ at each wheel position according to the estimated value of the friction coefficient $\mu$ of the road surface and the wheel brake cylinder hydraulic pressure $Pw^{}$ of each wheel can be calculated. Next, in step 107 a side slip angular velocity $D\beta$ is calculated as $D\beta=Gya/Vso-\gamma$ according to the detected signal from the yaw rate sensor YS (actual yaw rate $\gamma$), the detected signal from the lateral acceleration sensor YG (actual lateral acceleration Gya), and the vehicle speed Vso at the center of gravity position.

Then, in step 108, a vehicle side slip angle $\beta$ is calculated as $\beta=\int D\beta dt$. The vehicle side slip angle $\beta$ is the angle of the vehicle direction to the forward direction of the vehicle. The angular velocity of the vehicle skidding $D\beta$ is calculated as $d\beta/dt$ which is a differential derivation value of the vehicle side slip angle $\beta$. The vehicle side slip angle $\beta$ can be calculated as $\beta=\tan-1$ (Vy/Vx) using a vehicle speed Vx relative to the forward direction and a vehicle speed Vy in the lateral direction which at a right angle to Vx direction.

In step 109, a brake steering control calculation is performed and a target slip ratio for controlling is set up. Then, in step 110 traction control calculation is performed and the target slip ratio for controlling is set up. The details associated with the brake steering control calculation and the traction control calculation will be explained below. Finally, in step 111, a hydraulic pressure servo control is performed, with the hydraulic brake pressure controller PC being controlled in accordance with the vehicle motion. The details of the hydraulic pressure servo control is also described below. The program then returns to step 102.

The brake steering control calculation in step 109 of FIG. 3 is explained with reference to the subroutine shown in FIG. 5. The brake steering control calculation includes oversteering control (OS) and understeering control (US). With respect to the controlled wheels, a target slip ratio in accordance with the oversteering control or understeering control is set up. Initially, in steps 301 and 302, a start or termination of the oversteering control or understeering control is judged.

Figure 10:
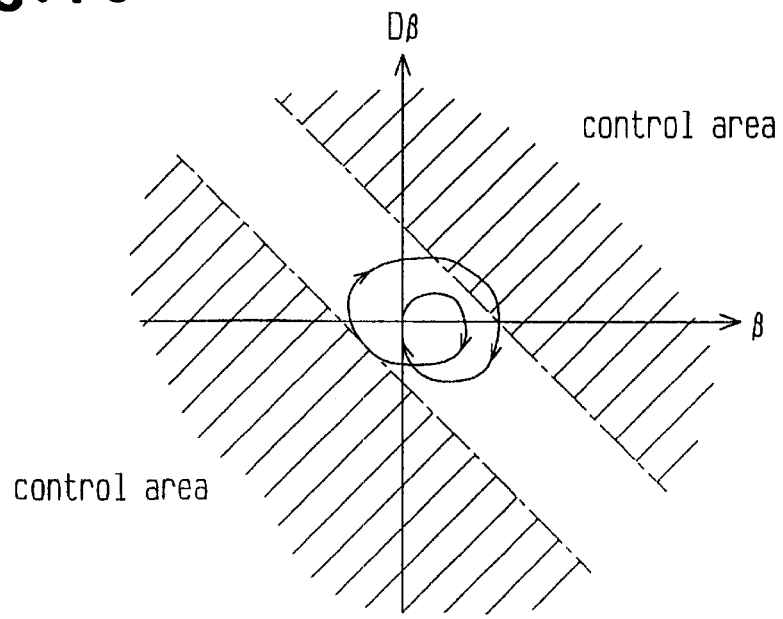
FIG. 10 is a graph showing a controlled area of oversteering control according to the present invention.

A start and termination judgment of the oversteering control in step 301 is performed based on the condition if the steering control is in a controlled area indicated with hatching in FIG. 10. When the value of the vehicle side slip angle $\beta$ and the side slip angular velocity $D\beta$ is in the controlled area, the oversteering control starts and when the steering control is out of the controlled area, the oversteering control is terminated. The oversteering is controlled as shown in FIG. 10 as a curve with an arrow. The braking force of each wheel is maximized at the point where the curve has the farthest distance from the borders between the controlled areas and the non-controlled area which are identified with the two dotted chain lines in FIG. 10.

Figure 11:
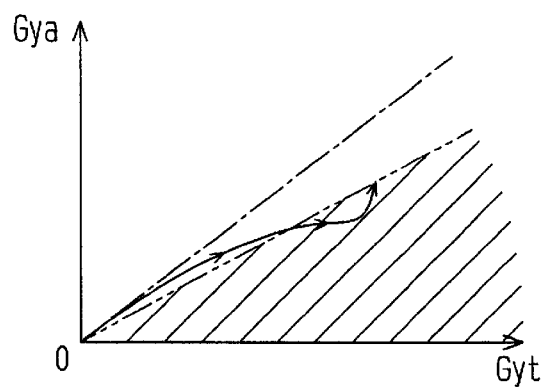
FIG. 11 is a graph showing a controlled area of understeering control according to the present invention.

A start and termination judgment of the understeering control is judged by the condition whether the steering control is in the controlled area indicated with hatching in FIG. 11. The understeering control starts when the steering control is off the orbit of an ideal condition shown by the one-dotted chain line and enters the controlled area in accordance with the change of the actual lateral acceleration Gya relative to the target lateral acceleration Gyt during the judgment. The understeering control is terminated when the steering control is out of the controlled area. The control is described as the arrowed curve in FIG. 11.

Next, in step 303, it is judged whether or not the oversteering control is under operation. If the oversteering control is not under operation, it is judged whether or not the understeering control is under operation. If the understeering control is not under operation, the process returns to the beginning of the main routine. In step 304, if it is judged that the understeering is under operation (controlling), the process proceeds to step 305, and the turning of the inner rear wheel and both front wheels are selected, with the target slip ratio of these wheels being set as Sturi, Stufo, and Stufi respectively at understeering control. In these designations, "S" stands for a slip ratio, "t" stands for a target which is compared with "a" mentioned later representing actual measure, "u" stands for understeering control, "f" stands for a front wheel, "r" stands for a rear wheel, "o" stands for outer, and "i" stands for inner.

A differential value between the target lateral acceleration Gyt and actual lateral acceleration Gya is used. The target lateral acceleration Gyt is determined based on the equation of $Gyt=\gamma(\theta f) \cdot Vso$. $\gamma(\theta f)$ is determined as $\gamma(\theta f)=\{(\theta f/N) \cdot L\} \cdot Vso/(1+Kh \cdot Vso2)$. Kh stands for a stability factor, N stands for a steering gear ratio, and L stands for a wheel base. The target slip ratio for understeering control is set as follows based on the deviation $\Delta Gy$ of the target lateral acceleration Gyt and the actual lateral acceleration. That is, Stufo is set as $KS \cdot \Delta Gy$ and a constant K5 is set as the value for control in the pressurizing direction (or pressure decreasing direction). Stufi and Sturi are set as $K6 \cdot \Delta Gy$ and $K7 \cdot \Delta Gy$ respectively, with the constants K6 and K7 being set as the value for control in the pressing direction.

In step 306, a load value $Fz^{**}$ of the controlled wheels (i.e., the front wheels and the turning inner rear wheel) is calculated. The turning outer front wheel load is calculated as $Fzfo=Wf-W \cdot DVso \cdot Kx+W \cdot Gya \cdot Ky$. The turning inner front wheel load is calculated as $Fzfi=Wf-W \cdot DVso \cdot Kx-W \cdot Gya \cdot Ky$. The turning inner rear wheel load is calculated as $Fzfi=Wf+W \cdot DVso \cdot Kx-W \cdot Gya \cdot Ky$. Wf stands for a front wheel static load, Wr stands for a rear wheel static load, W stands for a total load, Kx stands for a load moving coefficients in the longitudinal direction, Ky stands for a load moving coefficient in the lateral direction, $W \cdot DVso \cdot Kx$ stands for a total load moving in the longitudinal direction, and $W \cdot Gya \cdot Ky$ stands for a total load moving in the lateral direction.

In step 303, if it is judged that the oversteering control is under operation, the program proceeds to step 307 and it is judged whether or not the understeering control is under operation. If the understeering control is not under operation, the process goes to step 308. In step 308, a turning outer front wheel and a turning inner rear wheel are selected. The target slip ratios for these wheels are set as Stefo and Steri (=0) respectively, wherein "e" stands for the oversteering control.

To determine the target slip ratio, the vehicle side slip angle $\beta$ and the side slip angular velocity $D\beta$ are utilized. The following equations are set based on those values: $Stefo=K1 \cdot \beta+K2 \cdot D\beta$ and $Steri=K3 \cdot \beta+K4 \cdot D\beta$. K1 through K4 are constants. The target slip ratio Stefo of the turning outer front wheel is set at the value for the control in the pressurizing direction (i.e., the direction to increase the braking force). The target slip ratio Steri of the turning inner wheels is set at the value for the control in the pressure decrease direction (i.e., the direction to reduce the braking force). Accordingly, the equation Steri=0 is determined when the brake pedal is not under operation. $K3 \leq K1/5$ and $K4 \leq K2/5$ are also determined.

If it is judged at step 307 that the understeering control is under operation, the process proceeds to step 310. In step 310, the target slip ratio of the turning outer front wheel is set as Stefo for oversteering control. The target slip ratio of the turning inner front and rear wheels is set as Stufi and Sturi for understeering control. When the oversteering control and understeering control are performed simultaneously, the target slip ratio of the turning outer front wheel is set in the manner with the target slip ratio of the oversteering control. The target slip ratio of the turning inner front and rear wheels is set in the same manner with that of the understeering control.

In step 311, the load value $Fz^{**}$ of the controlled wheels (that is both front wheels and the turning inner rear wheel) is calculated in the same manner as in step 306.

In any case, the turning outer rear wheel (that is the driven wheel of the front wheel driving vehicle) is not controlled to calculate the vehicle speed Vso at the center of gravity position. The target slip ratio is not set for the turning outer rear wheel.

The operational details associated with the traction control calculation of step 110 in FIG. 3 will be explained with reference to FIG. 6. In step 401 of FIG. 6, a judgment is made for permission to judge if each wheel is ready for traction control. If it is judged that the acceleration pedal AP is under operation using a detected signal of the throttle sensor SS, it is then determined whether the brake pedal BP is under operation using the detected signal from the brake switch BS. When the acceleration pedal AP is under operation and the brake pedal BP is not under operation, the judgment to permit control is determined. When the acceleration pedal AP is not operated or when both the acceleration pedal AP and the brake pedal BP are operated, the judgment to prohibit the control is determined.

In step 402, it is determined whether or not the traction control is required regarding each wheel. In step 401, when a traction controller receives controlling permission and the actual slip ratio $Sa^{}$ exceeds the predetermined slip ratio Ss, it is judged that initiation of traction control is required. When the traction controller receives a determination of controlling prohibition in step 401 or in case the traction controller receives controlling permission but the actual slip ratio $Sa^{}$ of the wheel is less than the predetermined slip ratio Ss, it is judged that the traction control is not required to be initiated.

In step 403, it is determined whether termination of the traction control is required. The traction control is judged to be terminated when the judgment is switched from the control permitting condition to the control prohibiting condition in step 401 or when the actual slip ratio Sa of the wheel is reduced to be less than the predetermined slip ratio Se even though the control permission is given in step 401. Continuation of the traction control is determined when the control permission is given in step 401 and the actual slip ratio Sa of the wheel exceeds the predetermined slip ratio Se.

In step 404, it is determined whether or not traction control is under operation. When traction control is under operation, the process proceeds to step 405 and when the traction control is not under operation, the process returns to the beginning of the main routine. In step 405, the target slip ratio Stt is determined in accordance with the a friction coefficient $\mu$ of the road surface estimated in step 106 of FIG. 3. In step 406, the driving torque TD of the controlled wheel is calculated. Based on the throttle opening θt and the rotation number NE of the engine and using a predetermined map, an engine torque Et is calculated. The driving torque TD is calculated as TD=Et/2 using the obtained engine torque Et. When the two front wheels are the controlled wheels, the driving torque of these wheels is equal.

The operational details associated with the hydraulic pressure servo control in step 111 of FIG. 3 will be explained with reference to FIG. 7. A slip ratio servo control of the wheel brake cylinder for each controlled wheel is performed.

Figure 5:
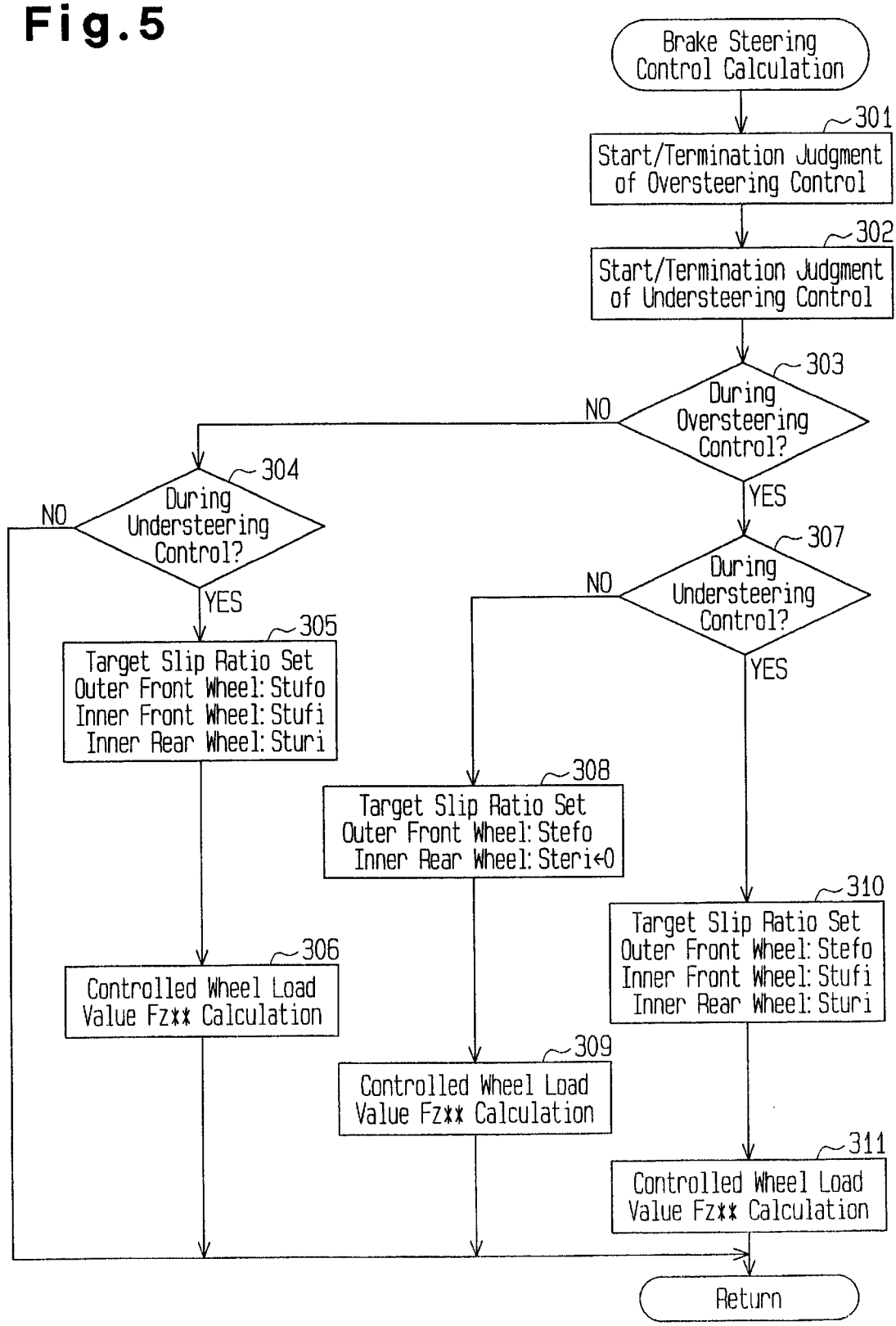
FIG. 5 is a flow chart showing the details of the brake steering control calculation carried out in step 109 of FIG. 3.
Figure 6:
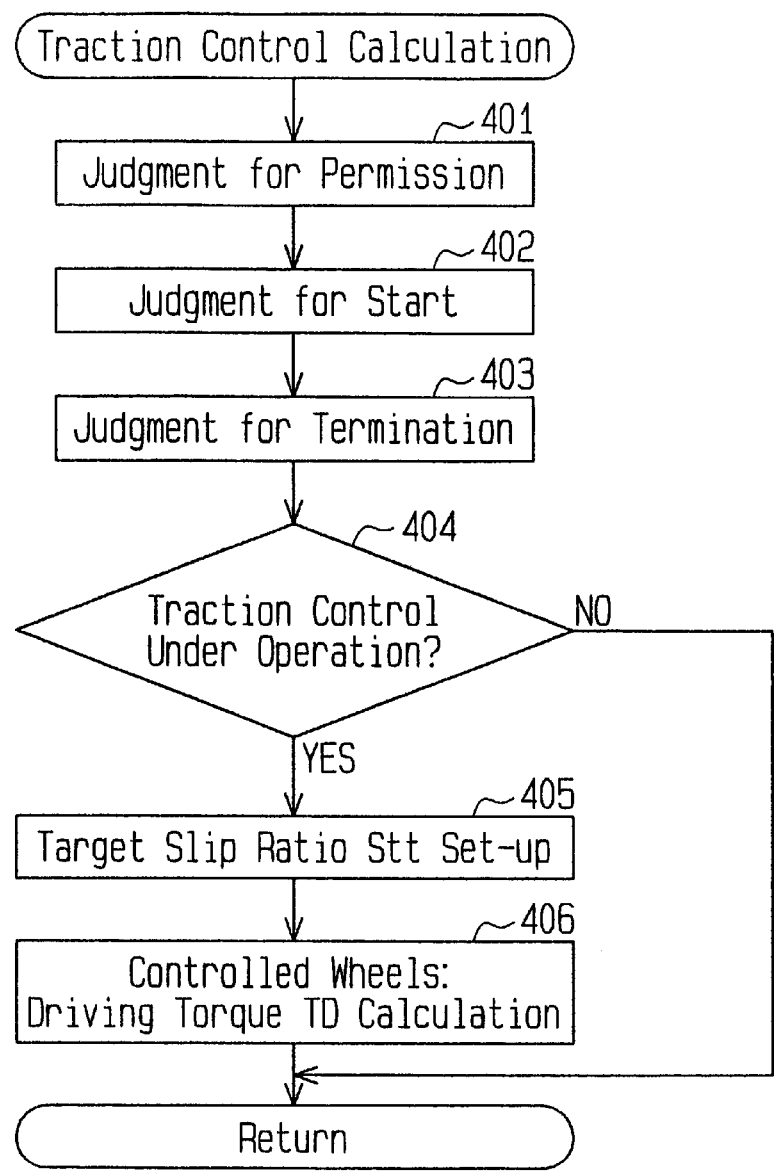
FIG. 6 is a flow chart showing the details of traction control calculation carried out in step 110 of FIG. 3.

In step 501, the target slip ratio (Stv) of the wheels where brake steering control should be performed as determined in steps 305, 308 and 310 in FIG. 5 and the target slip ratio Stt of the wheels where traction control should be performed as determined in step 405 of FIG. 6 are read out. When both brake steering control and traction control are performed at a wheel, the target slip ratio St is determined and renewed by adding the target slip ratio Stt for traction control to the target slip ratio Stv** for brake steering control.

In step 502, a slip ratio deviation ΔSt of each controlled wheel is calculated. In step 503, the vehicle acceleration deviation ΔDVso is calculated. In step 502, the difference between the target slip ratio St of the controlled wheel and the actual slip ratio Sa is calculated, then the slip ratio deviation ΔSt is obtained (ΔSt=St−Sa). In step 503, the difference between the vehicle acceleration DV at the center of gravity position and the wheel acceleration DVw is calculated, and the vehicle acceleration deviation ΔDVso is obtained. The calculation of the vehicle acceleration deviation ΔDVso varies depending on whether the controlling mode is the traction control or brake steering control. Based on knowledge in the art, a detailed explanation for these variations is not described here.

In step 504, one parameter Y for hydraulic brake pressure control at each controlling mode is calculated as Gs·ΔSt (Gs is a constant). In step 505, another parameter X for hydraulic brake pressure control is calculated as Gd·ΔDVso (Gd** is a constant).

Figure 12:
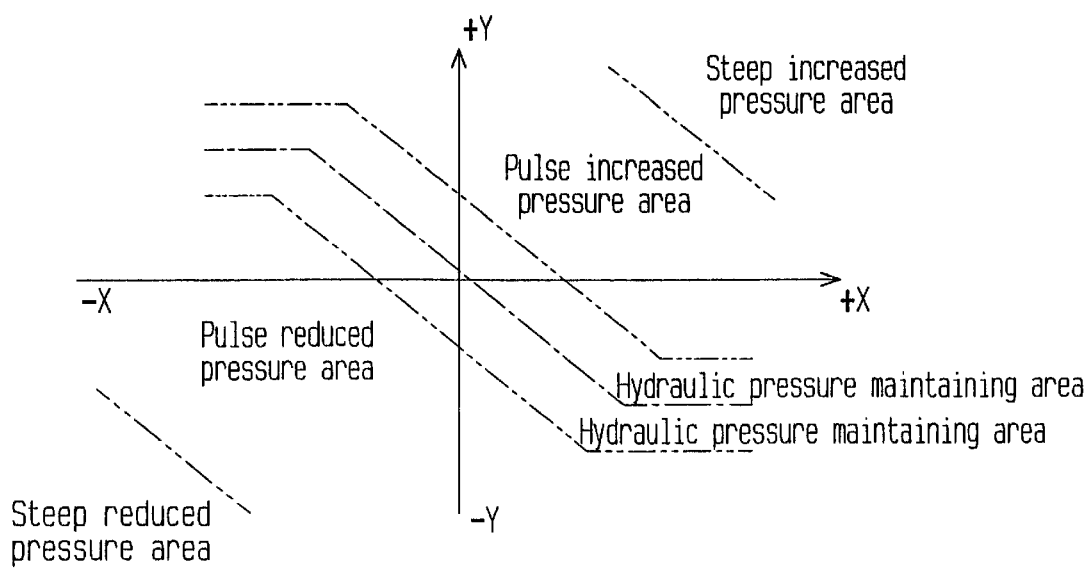
FIG. 12 is a graph showing the relationship of a parameter for hydraulic brake pressure control and hydraulic pressure mode (for a hydraulic brake pressure control) according to the present invention.

In step 506, for each controlled wheel, the hydraulic pressure mode based on the aforementioned parameters X and Y is set following a control map shown in FIG. 12. In FIG. 12, a steep reduced pressure area, a pulse reduced pressure area, a hydraulic pressure maintaining area, a pulse increased pressure area, and a steep increased pressure area are set in advance. In step 506, in accordance with values of the parameters X and Y, the corresponding area is chosen. The hydraulic pressure control mode is no set at the non-controlling condition (solenoid off).

In step 507, a maximum value of the necessary hydraulic pressure of the controlled wheel is calculated. In step 508, a driving transaction of the booster switch valve SB is conducted. An explanation of this will be set forth below. In step 509, the switching valve PC*, which functions as a hydraulic pressure control valve working in accordance with the hydraulic pressure mode determined in step 506, is controlled. The hydraulic brake pressure in the wheel brake cylinder increases is maintained or decreases. In step 510, the driving transaction of the motor M is conducted. The motor M continues to be energized while the traction control and brake steering control are performed.

The details of the maximum value of the necessary hydraulic pressure in step 507 of FIG. 7 will be explained with reference to FIG. 8. In step 601 of FIG. 8, a necessary hydraulic pressure Ptt for the traction control is calculated uniformly to all controlled wheels based on the driving torque TD of the controlled wheel obtained from the calculation in step 406 of FIG. 6. When the driving torque TD is less than a first predetermined value, the necessary hydraulic pressure Ptt of all controlled wheels is set at a first predetermined pressure (e.g., 2 Mpa). When the driving torque TD is greater than or equal to a second predetermined value which is larger than the first predetermined value, the necessary hydraulic pressure Ptt is set at a second predetermined pressure (e.g., 6 Mpa). When the driving torque TD is greater than or equal to the first predetermined value and less than the second predetermined value (the second value is larger than the first), the necessary hydraulic pressure Ptt is set to the value which is greater than or equal to the first predetermined pressure and less than the second predetermined pressure and which is directly proportional to the driving torque TD. The larger the driving torque TD, the higher the necessary hydraulic pressure Ptt because the level of acceleration slip is larger at larger driving torque.

In step 602, in accordance with the friction coefficient $\mu$ of the road surface estimated in step 106 of FIG. 3, a correction quantity ΔPtt of the aforementioned necessary hydraulic pressure Ptt is calculated. When the friction coefficient $\mu$ of the road surface (of a wheel) is less than a first predetermined value (e.g., 0.1 G), the correction quantity or value ΔPtt is set at a first predetermined quantity (e.g., 1 Mpa). When the friction coefficient $\mu$ of the road surface is greater than a second predetermined value (e.g., 0.8 G) which is larger than the first predetermined value, the correction quantity ΔPtt is set at the second predetermined quantity or value (e.g., 3 Mpa) which is larger than the first predetermined quantity. When the friction coefficient $\mu$ of the road surface is more than the first predetermined value and less than the second predetermined value, the correction quantity or value ΔPtt is set at a value or quantity which is more than the first predetermined value and less than the second predetermined value and which is directly proportional to the friction coefficient $\mu$ of the road surface. The higher the friction coefficient $\mu$ of the road surface, the larger the correction quantity ΔPtt. In step 603, the necessary hydraulic pressure Ptt is corrected as Ptt'=Ptt−ΔPtt. In steps 602 and 603, the correction quantity ΔPtt is set to a large volume when the first friction coefficient $\mu$ of the road surface is high compared to the case when it is low. As a result, the necessary hydraulic pressure Ptt' is set to be small after the correction. This is because the degree of the acceleration slip is smaller when the friction coefficient $\mu$ of the road surface is higher.

Figure 7:
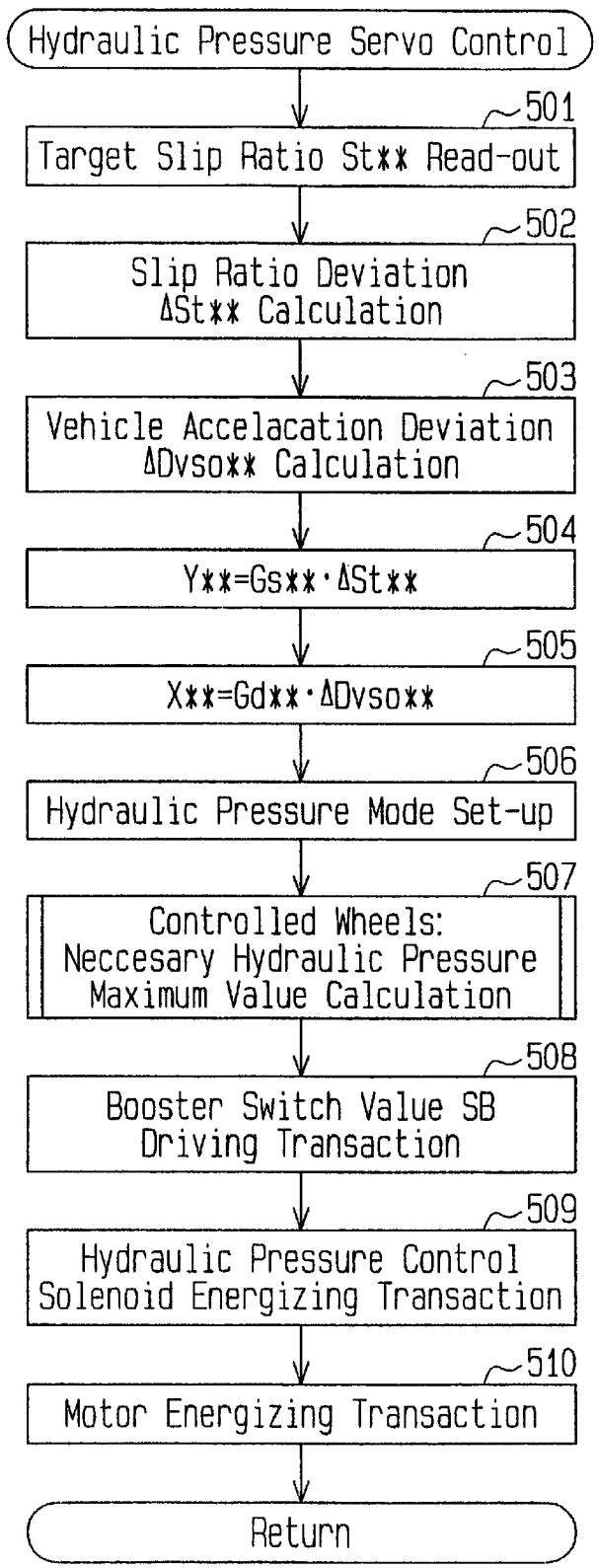
FIG. 7 is a flow chart showing the details of the hydraulic pressure control carried out in step 111 of FIG. 3.
Figure 8:
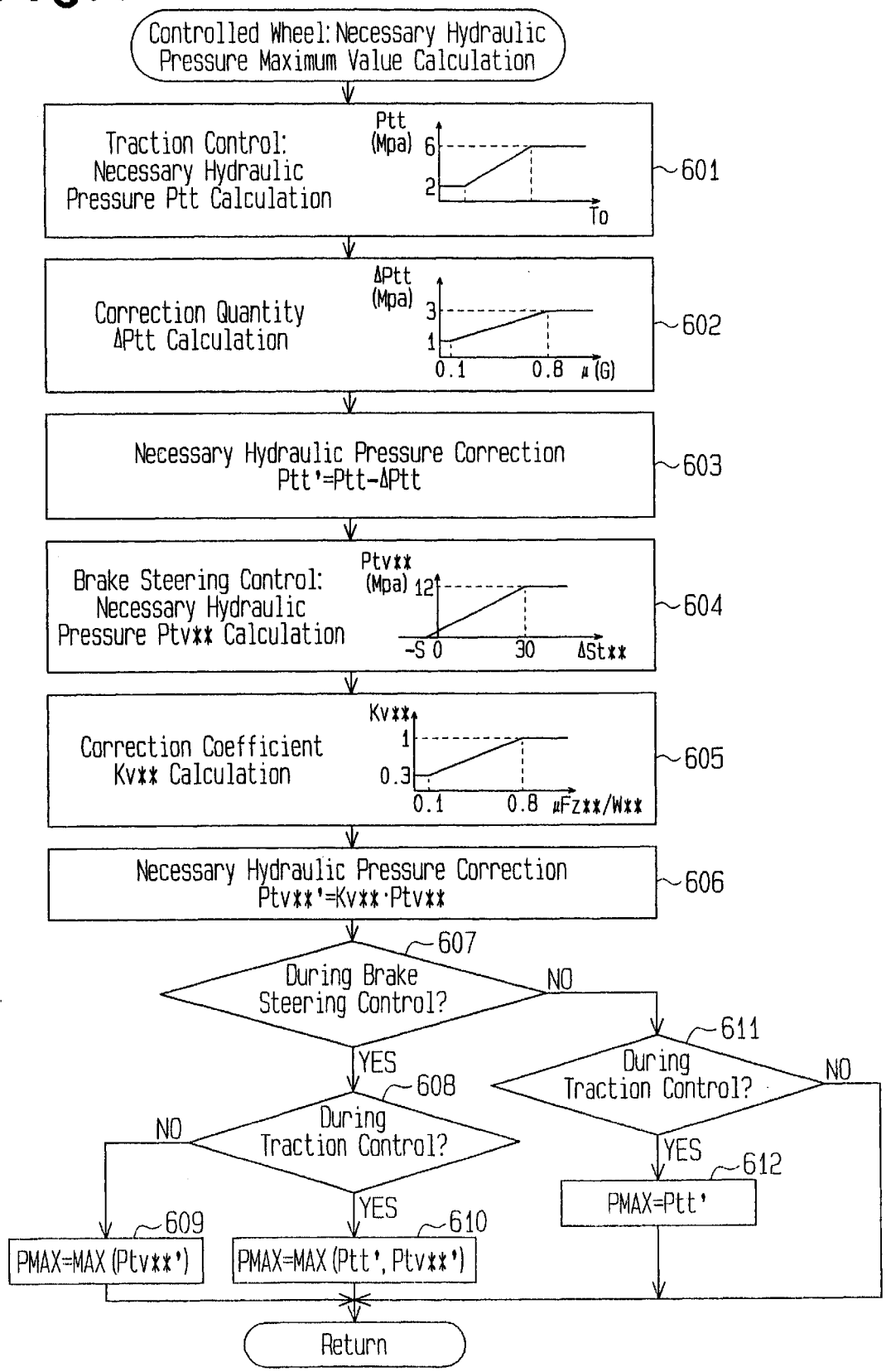
FIG. 8 is a flow chart showing the details of the calculation of the maximum value of the necessary hydraulic pressure carried out in step 507 of FIG. 7.

In step 604, based on the slip ratio deviation ΔSt calculated in step 502 of FIG. 7, a hydraulic pressure Ptv necessary for brake steering control is calculated for each controlled wheel. When the slip ratio deviation ΔSt is less than a predetermined value (e.g., less than 30%), the necessary hydraulic pressure Ptv of each controlled wheel is fixed at a value which is directly proportional to the slip ratio deviation ΔSt of the wheels. The larger the slip ratio deviation ΔSt, the higher the necessary hydraulic pressure Ptv. When the slip ratio deviation ΔSt of each controlled wheel is more than a predetermined value (e.g., more than 30%), the necessary hydraulic pressure Ptv** is fixed at a predetermined pressure (e.g., 12 Mpa).

In step 605, a correction coefficient Kv of the aforementioned necessary hydraulic pressure Ptv is calculated in accordance with the product of the friction coefficient $\mu$ of the road surface estimated in step 106 of FIG. 3 and the wheel load Fz calculated in steps 306, 309, and 311 of FIG. 5. When the product of the friction coefficient $\mu$ of the road surface and the wheel load ratio Fz/W (W is a static load) is less than a first predetermined value (e.g., 0.1 G), the correction coefficient Kv is set to the positive value (e.g., 0.3) which is less than 1. When the product of the friction coefficient $\mu$ and the ratio Fz/W is more than a second predetermined value (e.g., 0.8 G) which is larger than the first predetermined value, the correction coefficient Kv is set to 1. When $\mu$·Fz is more than the first predetermined value and less than the second predetermined value, the correction coefficient Kv is set to $0.3 \leq Kv \leq 1$ and set to the value which is directly proportional to $\mu$·Fz. The higher the value of $\mu$·Fz, the larger the correction coefficient Kv. In step 606, the necessary hydraulic pressure Ptv is corrected according to Ptv'=Kv·Ptv.

When the friction coefficient $\mu$ of the road surface is low, the value of the correction coefficient Kv has a small value and the necessary hydraulic pressure Ptv after correction is small. The necessary hydraulic pressure Ptv after correction of a wheel with a smaller load value Fz has a smaller value than a wheel with a larger load value Fz. This is because the wheel is apt to be locked at the low friction coefficient $\mu$ and with the wheel having a small load value Fz.

In step 607, it is determined whether or not the brake steering control is under operation. When the brake steering control is under operation, the process proceeds to step 608, and it is determined whether or not the traction control is under operation. When the traction control is not under operation, the process proceeds to step 609. In step 609, a maximum value of the necessary hydraulic pressure PMAX of all controlled wheels is calculated as PMAX=MAX (Ptv'). That is, when the brake steering control is under operation, the maximum hydraulic pressure of the necessary hydraulic pressure Ptv' after correction of all controlled wheels is determined as the necessary hydraulic pressure maximum value PMAX.

In step 608, when it is judged that the traction control is under operation, the process proceeds to step 610. The maximum value of the necessary hydraulic pressure PMAX is calculated as PMAX=MAX (Ptt, Ptv'). When both the brake steering control and the traction control are performed, the maximum hydraulic pressure of the necessary hydraulic pressure Ptt after the correction of the traction control and the necessary hydraulic pressure Ptv' after the correction of all controlled wheels of the brake steering control is determined as the maximum value of the necessary hydraulic pressure PMAX.

When it is determined that the brake steering control is not under operation in step 607, the process advances to step 611 where it is determined whether the traction control is under operation. When the traction control is under operation, the process proceeds to step 612, and the maximum value PMAX of the necessary hydraulic pressure is set as Ptt'. When it is judged that the traction control is not under operation, the process returns to the beginning of the main routine without setting the maximum value PMAX of the necessary hydraulic pressure.

Figure 9:
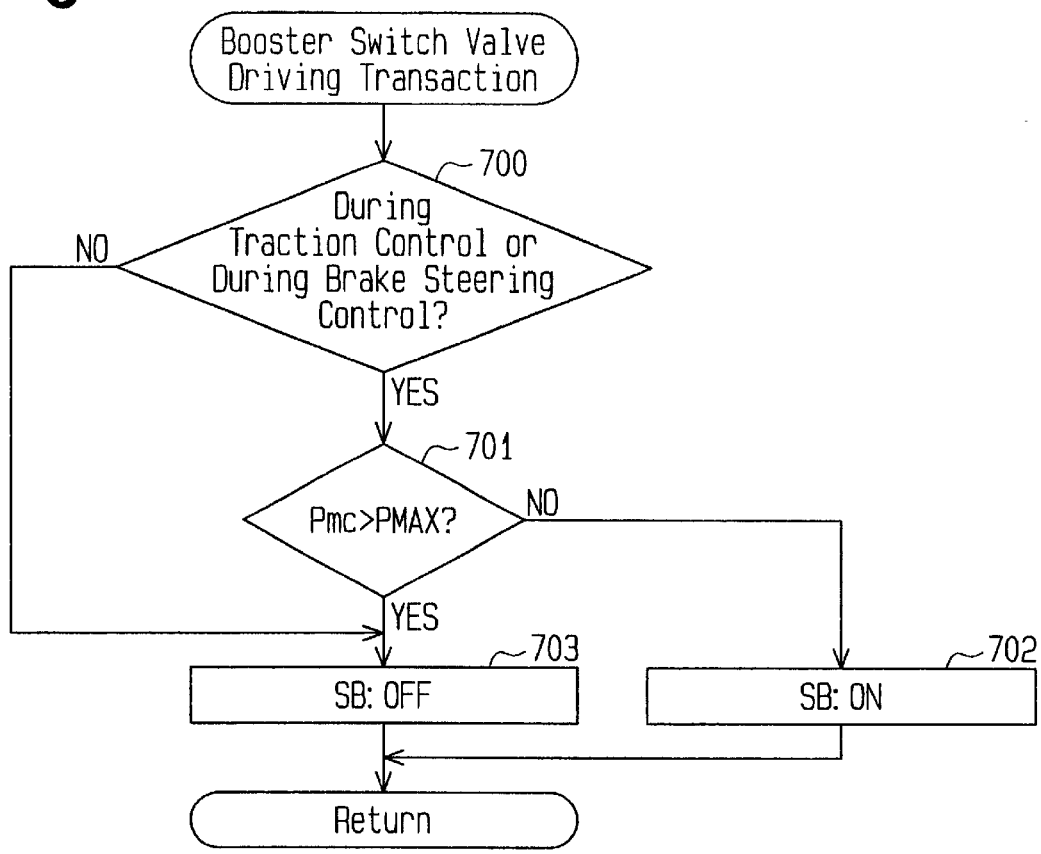
FIG. 9 is a flow chart showing the details of a booster switch valve actuating transaction carried out in step 508 of FIG. 7.

Finally, the details of the booster switch valve drive operation in step 508 of FIG. 7 will be explained with reference to FIG. 9. In step 700, it is judged whether the traction control or the brake steering control is under control. When the traction control or the brake steering control is under operation, the process advances to step 701, and a master cylinder hydraulic pressure Pmc is compared with the maximum value PMAX of the necessary hydraulic pressure calculated in FIG. 8. When the master cylinder hydraulic pressure Pmc is less than the maximum value PMAX of the necessary hydraulic pressure, the booster switch valve SB is turned on, and the auxiliary variable pressure chamber B6 is exposed to the atmosphere. The booster switch valve is turned on when the master cylinder hydraulic pressure Pmc is lower than the maximum value PMAX of the necessary hydraulic pressure or when the master cylinder hydraulic pressure Pmc is equal to the maximum value PMAX of the necessary hydraulic pressure. When the master cylinder hydraulic pressure Pmc is higher than the maximum value PMAX of the necessary hydraulic pressure, the booster switch valve SB is turned off, and the auxiliary variable pressure chamber B6 is in communication with the negative pressure (non-operative position).

At the beginning of the traction control and the brake steering control, the master cylinder hydraulic pressure Pmc is lower than the maximum value of the necessary hydraulic pressure (for example, in the case of traction control Pmc= 0), and so the booster switch valve is turned on.

When the master cylinder hydraulic pressure Pmc exceeds the maximum value PMAX of the necessary hydraulic pressure, the booster switch valve SB is turned off, and the hydraulic pressure Pmc decreases because of the introduction of the negative pressure in the auxiliary variable pressure chamber B6. On the other hand, when the master cylinder hydraulic pressure Pmc is less than the maximum value of the necessary hydraulic pressure, the booster switch valve SB turns on, and atmospheric air is introduced into the auxiliary variable pressure chamber B6. The booster switch valve SB is switched so that the master cylinder hydraulic pressure Pmc corresponds to the maximum value of the necessary hydraulic pressure under control.

In step 700, when it is judged that neither the traction control nor the brake steering control is being performed, the process advances to step 703 and the booster switch valve is turned off.

The maximum value PMAX of the necessary hydraulic pressure can be set at a higher value than the actual maximum value of the necessary hydraulic pressure.

In this embodiment of the present invention, because the booster switch valve SB is turned off when the master cylinder hydraulic pressure Pmc exceeds the maximum value of the necessary hydraulic pressure PMAX, which avoids an unnecessary rise of the master cylinder hydraulic pressure Pmc, switching noise generated when the hydraulic pressure control valve is switched is reduced.

The reduction of the frequency of operation of the hydraulic pressure control valve leads to the reduction of the frequency of the generation of the switching noise.

It is to be understood that instead of using a vacuum booster and a booster switch valve SB, a hydraulic pressure pump may be used to supply brake pressure to the wheel brake cylinders from the master cylinder MC and the master cylinder reservoir LRS via the hydraulic pressure control valve. Comparing the maximum value PMAX of the necessary hydraulic pressure with the output pressure of the hydraulic pressure pump, a motor for driving the pump may be duty-driven to adjust the pressure of the pump.

Although in this embodiment the traction control and the brake steering control are explained, this invention is also applicable to an automatic brake control (control of the distance between moving vehicles) and the control for automatic pressurization of wheel brake cylinder at the brake assistant control.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A vehicle motion control system comprising:
   a wheel brake cylinder for applying a braking force to a wheel;
   an automatic hydraulic pressure generator which generates a hydraulic pressure irrespective of brake pedal operation;
   a hydraulic pressure control valve disposed between said automatic hydraulic pressure generator and said wheel brake cylinder to adjust hydraulic brake pressure supplied to said wheel brake cylinder by alternatively connecting and disconnecting at least said automatic hydraulic pressure generator and said wheel brake cylinder;
   brake control means for performing vehicle motion control by controlling at least said hydraulic pressure control valve in accordance with a motion condition of the vehicle;
   hydraulic pressure detecting means for detecting a generated hydraulic pressure of the automatic hydraulic pressure generator;
   the brake control means including necessary hydraulic pressure setting means for setting the hydraulic pressure necessary for the motion control in accordance with the vehicle motion condition during the motion control; and
   hydraulic pressure adjusting means for adjusting the generated hydraulic pressure of the automatic hydraulic pressure generator compared with the necessary hydraulic pressure by controlling the automatic hydraulic pressure generator,
   wherein the necessary hydraulic pressure setting means sets the necessary hydraulic pressure for each controlled wheel in accordance with the vehicle motion condition during the motion control, the necessary hydraulic pressure being calculated at a maximum value of the necessary hydraulic pressure of a plurality of controlled wheels when a plurality of wheels are to be controlled, the hydraulic pressure adjusting means being adapted to control the automatic hydraulic pressure generator and to adjust the generated hydraulic pressure of the automatic hydraulic pressure generator in accordance with a result of a comparison between the generated hydraulic pressure of the automatic hydraulic pressure generator and the maximum value of the necessary hydraulic pressure of the plurality of the controlled wheels.

2. The vehicle motion control system according to claim 1, wherein the hydraulic pressure adjusting means adjusts the generated hydraulic pressure of the automatic hydraulic pressure generator to meet with the necessary hydraulic pressure of the controlled wheels.

3. The vehicle motion control system according to claim 1, wherein the automatic hydraulic pressure generating means includes a master cylinder generating a hydraulic pressure in response to operation of the brake pedal, a vacuum booster actuating the master cylinder, and a switching solenoid valve selectively switchable between an operative position in which the master cylinder is at least partially operated by actuating the vacuum booster irrespective of operation of the brake pedal and a non-operative position in which the vacuum booster is not operated, the hydraulic pressure detecting means including a hydraulic pressure sensor detecting the generated hydraulic pressure of the master cylinder, the hydraulic pressure adjusting means adjusting the generated hydraulic pressure of the master cylinder by actuating the switching solenoid valve in accordance with a result of a comparison between the generated hydraulic pressure of the master cylinder and the necessary hydraulic pressure for the motion control.

4. The vehicle motion control system according to claim 3, wherein the vacuum booster includes:
   a movable partition;
   a constant pressure chamber formed in front of the movable partition and into which negative pressure is introduced;
   a variable pressure chamber formed in back of the movable partition and adapted to be selectively communicated with the constant pressure chamber for introducing negative pressure into the variable pressure chamber and blocked from communication with the constant pressure chamber and exposed to atmosphere;
   a valve mechanism opening and closing communication between the constant pressure chamber and the variable pressure chamber and communication between the variable pressure chamber and the atmosphere;
   an auxiliary movable partition disposed in the constant pressure chamber to actuate the master cylinder in accordance with the motion of the brake pedal while also actuating the master cylinder when the brake pedal is not operated; and
   an auxiliary variable pressure chamber formed between the auxiliary movable partition and the movable partition, the switching solenoid valve being adapted to selectively switch between the non-operative position introducing the negative pressure into the auxiliary variable pressure chamber and the operative position connecting the auxiliary variable pressure chamber to atmosphere.

5. A vehicle motion control system comprising:
   a wheel brake cylinder for applying a braking force to a wheel;
   an automatic hydraulic pressure generator which generates a hydraulic pressure irrespective of brake pedal operation;
   a hydraulic pressure control valve disposed between said automatic hydraulic pressure generator and said wheel brake cylinder to adjust hydraulic brake pressure supplied to said wheel brake cylinder by alternatively connecting and disconnecting at least said automatic hydraulic pressure generator and said wheel brake cylinder;

brake control means for performing vehicle motion control by controlling at least said hydraulic pressure control valve in accordance with a motion condition of the vehicle;

hydraulic pressure detecting means for detecting a generated hydraulic pressure of the automatic hydraulic pressure generator;

the brake control means including necessary hydraulic pressure setting means for setting the hydraulic pressure necessary for the motion control in accordance with the vehicle motion condition during the motion control; and hydraulic pressure adjusting means for adjusting the generated hydraulic pressure of the automatic hydraulic pressure generator compared with the necessary hydraulic pressure by controlling the automatic hydraulic pressure generator, wherein the necessary hydraulic pressure setting means sets a necessary hydraulic pressure for each motion control and calculates a maximum value of a plurality of necessary hydraulic pressures when plural motion controls are performed on the vehicle, the hydraulic pressure adjusting means adjusting the generated hydraulic pressure of the automatic hydraulic pressure generator by controlling the automatic hydraulic pressure generator in accordance with a result of a comparison between the generated hydraulic pressure of the automatic hydraulic pressure generator and the maximum value of the necessary hydraulic pressure.

6. The vehicle motion control system according to claim 5, wherein the brake control means includes traction control means applying a brake torque to a driving wheel by controlling the hydraulic pressure control valve in accordance with an acceleration slip condition of the driving wheel of the vehicle during the acceleration of the vehicle and brake steering control means applying a braking force to at least one wheel of the vehicle by controlling the hydraulic pressure control valve in accordance with an oversteering or understeering tendency of the vehicle, the necessary hydraulic pressure setting means setting a necessary hydraulic pressure for the traction control in accordance with the acceleration slip condition during the traction control, setting the necessary hydraulic pressure for each controlled wheel in accordance with the oversteering or understeering tendency of the vehicle during the brake steering control, and calculating a maximum value of the necessary hydraulic pressure of the brake steering control wheels set for each wheel and the necessary hydraulic pressure of the traction control when both traction control and the brake steering control are performed on the vehicle, the hydraulic pressure adjusting means adjusting the generated hydraulic pressure of the automatic hydraulic pressure generator by controlling the automatic hydraulic pressure generator in accordance with a result of a comparison between the generated hydraulic pressure of the automatic hydraulic pressure generator and the maximum value of the necessary hydraulic pressure.

7. A vehicle motion control system comprising:

a wheel brake cylinder for applying a braking force to a wheel;

an automatic hydraulic pressure generator which generates a hydraulic pressure including during non-operation of a brake pedal;

a hydraulic pressure control valve disposed between said automatic hydraulic pressure generator and said wheel brake cylinder to adjust hydraulic brake pressure supplied to said wheel brake cylinder by alternatively connecting and disconnecting at least said automatic hydraulic pressure generator and said wheel brake cylinder;

hydraulic pressure detecting means for detecting a generated hydraulic pressure of the automatic hydraulic pressure generator;

brake control means for performing vehicle motion control by controlling at least said hydraulic pressure control valve in accordance with a motion condition of the vehicle, the brake control means including necessary hydraulic pressure setting means for setting a necessary hydraulic pressure that is necessary for effecting the motion control in accordance with the motion condition of the vehicle and comparing means for comparing the necessary hydraulic pressure set by the necessary hydraulic pressure setting means with the generated hydraulic pressure detected by the hydraulic pressure detecting means; and hydraulic pressure adjusting means for adjusting the generated hydraulic pressure of the automatic hydraulic pressure generator based on results of the comparison between the necessary hydraulic pressure and the generated hydraulic pressure, wherein the necessary hydraulic pressure setting means sets the necessary hydraulic pressure for each of a plurality of controlled wheels in accordance with the vehicle motion condition during the motion control, the necessary hydraulic pressure being calculated at a maximum value of the necessary hydraulic pressure of the controlled wheels when a plurality of wheels are to be controlled, the hydraulic pressure adjusting means being adapted to control the automatic hydraulic pressure generator and to adjust the generated hydraulic pressure of the automatic hydraulic pressure generator in accordance with a result of a comparison between the generated hydraulic pressure of the automatic hydraulic pressure generator and the maximum value of the necessary hydraulic pressure of the plurality of the controlled wheels.

8. The vehicle motion control system according to claim 7, wherein the hydraulic pressure adjusting means adjusts the generated hydraulic pressure of the automatic hydraulic pressure generator to meet with the necessary hydraulic pressure of the controlled wheels.

9. The vehicle motion control system according to claim 7, wherein the necessary hydraulic pressure setting means sets the necessary hydraulic pressure based on a driving torque of the wheel.

10. The vehicle motion control system according to claim 9, wherein the necessary hydraulic pressure setting means sets the necessary hydraulic pressure at a first predetermined pressure when the driving torque is less than a first predetermined value, and sets the necessary hydraulic pressure at a second predetermined pressure greater than the first predetermined pressure when the driving torque is equal to or greater than a second predetermined value greater than the first predetermined value.

11. The vehicle motion control system according to claim 10, wherein the necessary hydraulic pressure setting means sets the necessary hydraulic pressure at a third pressure equal to or greater than the first predetermined pressure and less than the second predetermined pressure when the driving torque is greater than or equal to the first predetermined value and less than the second predetermined value.

12. The vehicle motion control system according to claim 10, wherein the necessary hydraulic pressure setting means sets the necessary hydraulic pressure at a pressure directly proportional to the driving torque when the driving torque is greater than or equal to the first predetermined value and less than the second predetermined value.

13. The vehicle motion control system according to claim 7, wherein the necessary hydraulic pressure setting means sets a necessary hydraulic pressure for each motion control and calculates a maximum value of a plurality of necessary hydraulic pressures when plural motion controls are performed on the vehicle, the hydraulic pressure adjusting means adjusting the generated hydraulic pressure of the automatic hydraulic pressure generator by controlling the automatic hydraulic pressure generator in accordance with a result of a comparison between the generated hydraulic pressure of the automatic hydraulic pressure generator and the maximum value of the necessary hydraulic pressure.

14. The vehicle motion control system according to claim 13, wherein the brake control means includes traction control means applying a brake torque to a driving wheel by controlling the hydraulic pressure control valve in accordance with an acceleration slip condition of the driving wheel of the vehicle during the acceleration of the vehicle and brake steering control means applying a braking force to at least one wheel of the vehicle by controlling the hydraulic pressure control valve in accordance with an oversteering or understeering tendency of the vehicle, the necessary hydraulic pressure setting means setting a necessary hydraulic pressure for the traction control in accordance with the acceleration slip condition during the traction control, setting the necessary hydraulic pressure for each controlled wheel in accordance with the oversteering or understeering tendency of the vehicle during the brake steering control, and calculating a maximum value of the necessary hydraulic pressure of the brake steering control wheels set for each wheel and the necessary hydraulic pressure of the traction control when both traction control and the brake steering control are performed on the vehicle, the hydraulic pressure adjusting means adjusting the generated hydraulic pressure of the automatic hydraulic pressure generator by controlling the automatic hydraulic pressure generator in accordance with a result of a comparison between the generated hydraulic pressure of the automatic hydraulic pressure generator and the maximum value of the necessary hydraulic pressure.

15. A vehicle motion control system according to claim 7, wherein the automatic hydraulic pressure generating means includes a master cylinder generating a hydraulic pressure in response to operation of the brake pedal, a vacuum booster actuating the master cylinder, and a switching solenoid valve selectively switchable between an operative position in which the master cylinder is at least partially operated by actuating the vacuum booster irrespective of operation of the brake pedal and a non-operative position in which the vacuum booster is not operated, the hydraulic pressure detecting means including a hydraulic pressure sensor detecting the generated hydraulic pressure of the master cylinder, the hydraulic pressure adjusting means adjusting the generated hydraulic pressure of the master cylinder by actuating the switching solenoid valve in accordance with a result of a comparison between the generated hydraulic pressure of the master cylinder and the necessary hydraulic pressure for the motion control.

16. The vehicle motion control system according to claim 15, wherein the vacuum booster includes:
  a movable partition;
  a constant pressure chamber formed in front of the movable partition and into which negative pressure is introduced;
  a variable pressure chamber formed in back of the movable partition and adapted to be selectively communicated with the constant pressure chamber for introducing negative pressure into the variable pressure chamber and blocked from communication with the constant pressure chamber and exposed to atmosphere;
  a valve mechanism opening and closing communication between the constant pressure chamber and the variable pressure chamber and communicating between the variable pressure chamber and the atmosphere;
  an auxiliary movable partition disposed in the constant pressure chamber to actuate the master cylinder in accordance with the motion of the brake pedal while also actuating the master cylinder when the brake pedal is not operated; and
  an auxiliary variable pressure chamber formed between the auxiliary movable partition and the movable partition.

17. The vehicle motion control system according to claim 16, wherein the switching solenoid valve is adapted to selectively switch between the non-operative position introducing the negative pressure into the auxiliary variable pressure chamber and the operative position connecting the auxiliary variable pressure chamber to atmosphere.

* * * * *